Sept. 25, 1945.   L. O. CARLSEN   2,385,331
MACHINE FOR PRODUCING GEARS
Filed Aug. 2, 1941    4 Sheets-Sheet 1

Inventor
LEONARD O. CARLSEN
By
Attorney

Sept. 25, 1945.   L. O. CARLSEN   2,385,331
MACHINE FOR PRODUCING GEARS
Filed Aug. 2, 1941   4 Sheets-Sheet 2
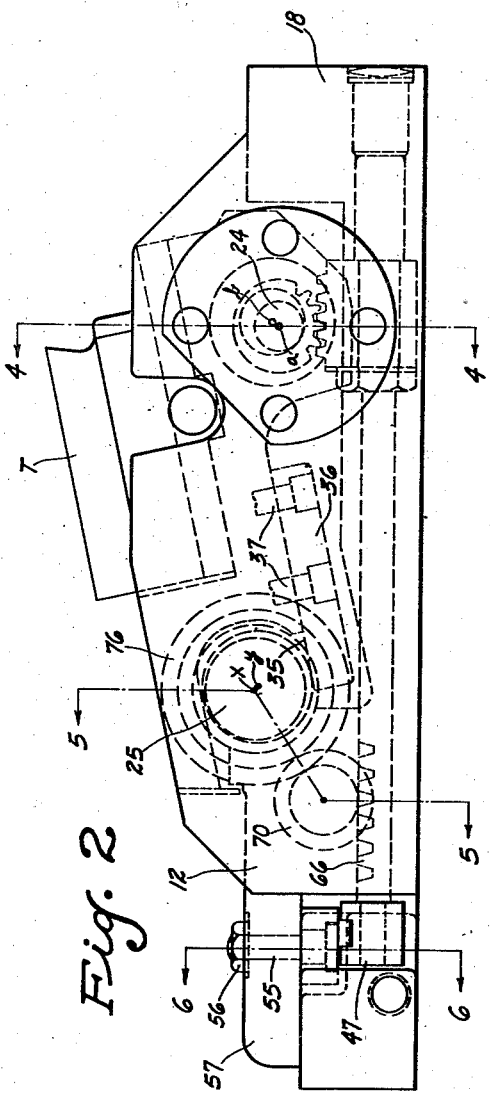
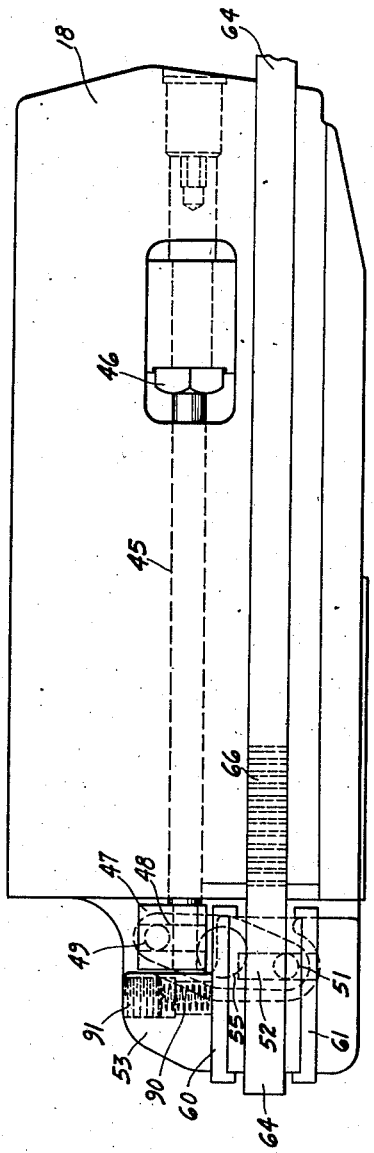
Inventor
LEONARD O. CARLSEN
By
Attorney Sept. 25, 1945.   L. O. CARLSEN   2,385,331
MACHINE FOR PRODUCING GEARS
Filed Aug. 2, 1941   4 Sheets-Sheet 3

Inventor
LEONARD O. CARLSEN
By
Attorney

Sept. 25, 1945.    L. O. CARLSEN    2,385,331
MACHINE FOR PRODUCING GEARS
Filed Aug. 2, 1941    4 Sheets-Sheet 4

Inventor
LEONARD O. CARLSEN
By
Attorney

Patented Sept. 25, 1945

2,385,331

UNITED STATES PATENT OFFICE 2,385,331

MACHINE FOR PRODUCING GEARS

Leonard O. Carlsen, Rochester, N. Y., assignor to Gleason Works, Rochester, N. Y., a corporation of New York Application August 2, 1941, Serial No. 405,225

12 Claims. (Cl. 90—6)

The present invention relates to machines for producing gears and particularly to machines of the reciprocating tool type for cutting straight bevel gears.

For many years it has been common practice to cut spiral bevel and hypoid gears so that the meshing tooth surfaces of mating gears have less than full length contact or tooth bearing. Gears so made will run quietly together even though displaced somewhat from theoretically correct running positions. Hence, such gears are readily able to accommodate themselves to the variations in mountings and loads that are encountered in use. Until very recently, however, such methods as have been devised for cutting straight tooth bevel gears with localized tooth bearing have required considerable mathematical calculation and have not gone into general use. In my pending application, Serial No. 300,025, filed October 18, 1939, now Patent No. 2,352,689, issued July 4, 1944, though, I have disclosed a new type of machine for cutting straight bevel gears on which straight bevel gears may be cut with a localized tooth bearing by a very simple, practical cutting method.

A primary object of the present invention is to make it possible to cut straight bevel gears with a localized tooth bearing on conventional type straight bevel gear generators with but slight modification of such machines.

Other objects of the invention will be apparent hereinafter from the specification and from the recital of the appended claims.

In the two-tool straight bevel gear generators in common use, the tip of each tool travels throughout the whole of its cutting stroke in a plane, ordinarily the root plane or a plane parallel thereto. Each tool is secured to a clapper block that is pivotally mounted on a reciprocatory tool slide. The two tool slides are reciprocated simultaneously in opposite directions to move the tools back and forth across the face of the gear blank. At opposite ends of the stroke of each tool slide, the clapper block is swung in opposite directions, respectively, to move the tool to or from cutting position. Each tool cuts on the movement of its slide in one direction and is out of cutting position on the return stroke of its slide, and the tools cut alternately. In the preferred embodiment of the present invention, the pivoted clapper block is retained, but the pivot for the clapper block is in the form of an eccentric that is rotated during the cutting stroke of the tool. The rotation of the eccentric causes the tool to move first outwardly and then inwardly in the direction of tooth depth as the tool is carried across the face of the gear blank by a stroke of the tool slide. Thus the tool cuts deeper at the ends of the tooth space than at the center thereof, and produces a longitudinally crowned tooth, that is, a tooth having a localized tooth bearing.

In the preferred embodiment of the invention, the mechanism for rotating the eccentric pivot during cutting comprises a set of change gears which is actuated by the movement of the tool slide itself. For moving the tool to and from cutting position at opposite ends of the stroke of the tool slide, the clapper block is swung in one direction or the other about its eccentric pivot. The mechanism for effecting this movement of the clapper block may be of conventional form although I have illustrated a somewhat improved mechanism for this purpose.

In the drawings:

Fig. 2 is a plan view of one of the tool slides of this machine and its associated parts;

Fig. 3 is the rear elevation of this slide;

Figure 1:
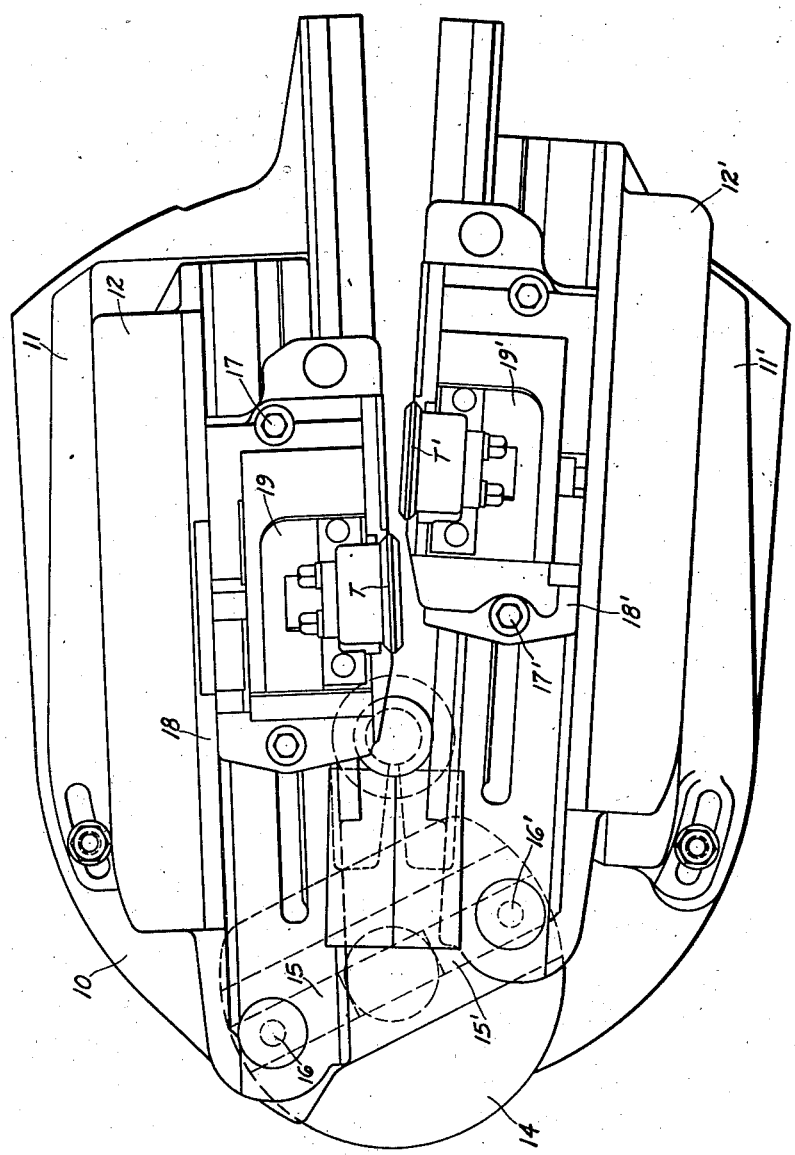
Fig. 1 is a front elevational view of a two tool generator of standard construction provided with a tool mechanism constructed according to the present invention for cutting straight bevel gears with localized tooth bearing.

As previously stated, one purpose of the present invention is to provide a tool mechanism that may be employed on standard type straight bevel gear generators, for cutting straight bevel gears with localized tooth bearing. In Fig. 1 of the drawings, I have illustrated how a straight bevel gear generator, which is constructed according to the Head et al. Patent No. 1,656,633 of January 17, 1928, may be modified according to the present invention to effectuate the purpose of this invention. The cutting tools are here denoted at T and T'. They are reciprocable planing tools of conventional construction. 10 denotes the cradle of the machine; 11 and 11' are the tool arms; 12 and 12' the tool slides. The tool slides reciprocate on the tool arms, being actuated by a crank driven mechanism which includes the actuating plate 14, the blocks 15 and 15', which are slidably mounted on that plate, and the pins 16 and 16' which connect these blocks with the tool slides. The tool arms 11 and 11' are mounted for angular adjustment on the face of the cradle to control the paths of longitudinal convergence of the tools. The tool slides carry the tool boxes 18 and 18', respectively. These tool boxes are adjustably secured to the tool slides by the T-bolts 17 and 17', respectively. Pivotally mounted upon the tool boxes are clapper blocks 19 and 19'. The tools T and T' are secured to these clapper blocks in the same manner as are the tools in the patents mentioned.

Figure 5:
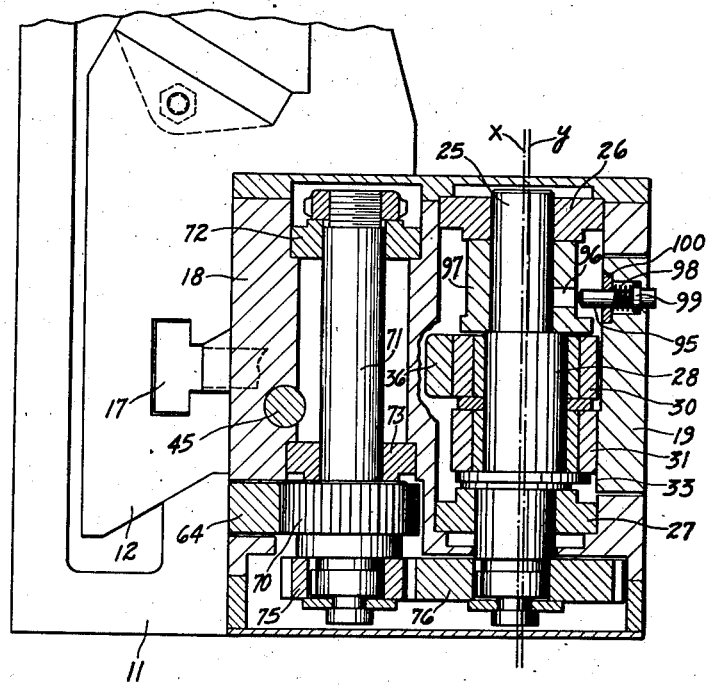
Fig. 5 is a section taken generally on the line 5—5 of Fig. 2.

The mechanisms for actuating the two tools are identical and only one need be described in detail. The clapper block 19 is carried in the tool box 18 by means of two shafts 24 and 25. The shaft 25 (Fig. 5) is mounted in the tool box 18 in suitable bearings 26 and 27. This shaft is mounted to rotate on an axis $x$ but it has a portion 28 intermediate its ends which has its periphery turned eccentric of the shaft and which has a center $y$ offset from the axis $x$ of the shaft.

Mounted on the eccentric portion 28 of the shaft, one above the other are a pair of rollers denoted at 30 and 31, respectively. The roller 31 bears against the back surface 33 of the clapper block 19 while the roller 30 bears against the front face 35 of a block 36 (Fig. 2) which is secured by screws 37 to the rear face of the clapper block. The block 36 is mounted to contact with the roller 30 at a point approximately 180° from the point of contact of the roller 31 with the clapper block, and the block 36 is adjusted so that all play is taken up between the rollers and the clapper block. Hence, when the shaft 25 is rotated on its axis, the motion of the shaft is transmitted directly to the clapper block 19 through the eccentric 28 and the rollers 30 and 31.

Figure 4:
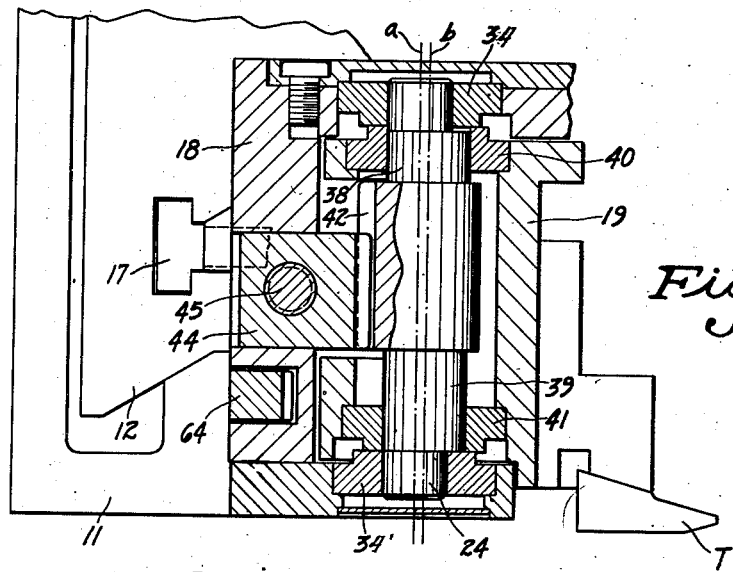
Fig. 4 is a section through the slide and arm taken on the line 4—4 of Fig. 2.
Figure 6:
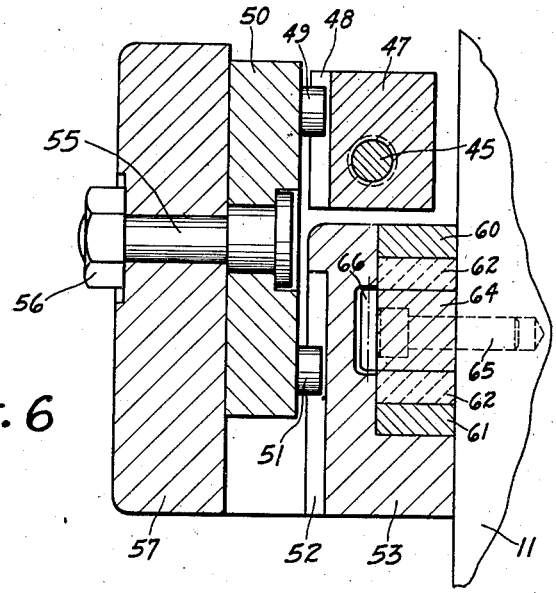
Fig. 6 is a sectional view on an enlarged scale taken generally on the line 6—6 of Fig. 2.

The shaft 24 (Fig. 4) is journaled in the box 18 on bearings 34 and 34' for rotation about an axis $a$. It has two eccentrically turned portions 38 and 39 formed on it that have a common axis or center $b$ which is eccentric of the axis $a$. These portions 38 and 39 seat in the bearing members 40 and 41, respectively, which are secured to the clapper block 19. Between the eccentric parts 38 and 39, the shaft is provided with a spur gear segment 42. This segment meshes with a rack member 44 which is secured against a shoulder on a rod 45 by a nut 46 (Fig. 3) that threads onto the rod. The rod 45 is slidably mounted in the tool box 18. It has a block 47 secured to it at one end. This block has a rectilinear slot or groove 48 (Fig. 6) formed in its front face. The pin 49, that is secured to or is integral with the lever 50, engages in the groove 48. The lever 50 carries another pin 51 that engages in a rectilinear slot or groove 52 formed in a friction box 53. The lever 50 is pivotally mounted intermediate its ends, being journaled on the pin 55 which is secured by means of the nut 56 to the arm or projection 57 of the tool box 18.

Mounted in the friction box 53 are two plates 60 and 61 whose opposed faces are lined with suitable friction material 62 to engage the upper and lower faces, respectively, of a rack bar 64. The rack bar 64 is secured to the tool arm 11 of the machine by screws 65. It is formed on its front face with rack teeth 66. These teeth mesh with a spur gear 70 (Figs. 2 and 5) that is fastened to a shaft 71. The shaft 71 is journaled in the tool box 18 on suitable bearings 72 and 73. It has a spur pinion 75 keyed to its lower end. This pinion meshes with a spur gear 76 that is keyed to the lower end of the shaft 25. It will be seen, then, that as the tool slide 12 is reciprocated back and forth, the gear 70 will roll in one direction or the other on the relatively stationary rack 64. Thus the shaft 25 will be rotated in one direction under actuation of the gearing 70, 75, and 76 when the tool slide is making its cutting stroke, and will be rotated in the opposite direction on the return stroke of the tool slide.

Figure 7:
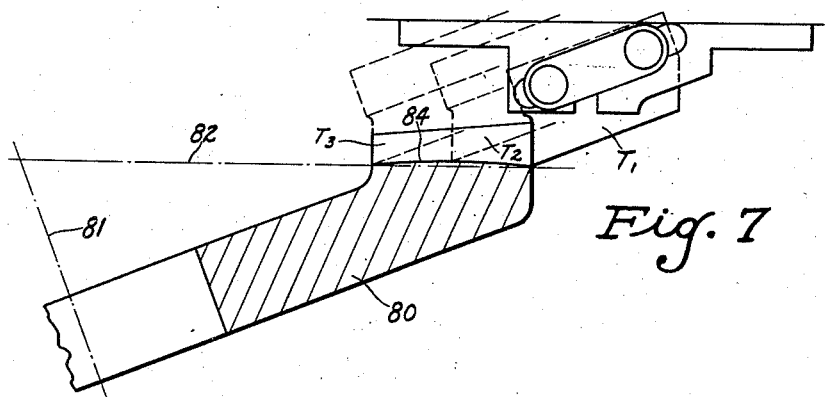
Fig. 7 is a diagrammatic view showing a fragment of a bevel gear in section and illustrating the movement of a tool in cutting a tooth of the gear according to the present invention.
Figure 8:
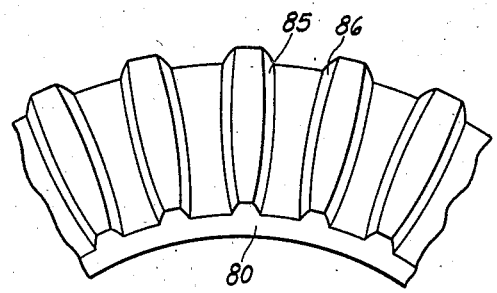
Fig. 8 is a fragmentary plan view of a straight bevel gear having longitudinally crowned teeth such as may be cut with the tool mechanism of the present invention.

The shaft 24 is stationary except at the ends of the stroke of the tool slide. Hence the shaft 24 acts as a pivot about which the clapper block 19 moves during the cutting and return strokes of the tool slide so that the tool may travel during cutting in a depthwise arcuate path across the face of the blank under actuation of the eccentric portion 28 of the shaft 25. This is illustrated diagrammatically in Fig. 7. Here 80 denotes the gear which is to be cut. 81 is its axis and 82 is its normal root plane. $T_1$, $T_2$, $T_3$, denote, respectively, three different positions of a tool during the cutting of a tooth of the gear blank 80. Due to the pivotal movement of the clapper block during cutting about the axis of the shaft 24 under actuation of the eccentric 28, the tip of the tool will follow an arcuate path during cutting and will cut a tooth space having a convex bottom 84. Since each tool has a positive pressure angle and cuts under actuation of the eccentric 28 at less depth at the center of the tooth space than at the ends thereof, teeth will be produced upon the gear having side surfaces 85 and 86 which are longitudinally crowned as shown in Fig. 8. Such a gear will mesh with a similarly cut gear or with a gear cut in standard manner with a localized tooth bearing.

As the tool slide 12 travels back and forth, the friction box 53 slides along the bar 64, and the depthwise position of the tool is controlled wholly by the eccentric 28. At the ends of the stroke of the tool slide, however, when the slide reverses, the tension exerted on the friction box causes a relative movement between the friction box and the tool slide. Hence at the ends of the stroke, the lever 50 is rocked about its pivot 55 because of the engagement between the pin 51 and the groove 52. The rocking motion of the lever is transmitted, then, through the pin 49, groove 48, and block 47 to the rod 45 and rack 44. This causes the segment 42 to be rotated, causing the eccentrics 38 and 39 to swing the clapper block 19 about the axis of the shaft 25, which now forms a pivot for the clapper block, to move the tool to or from cutting position.

The friction exerted on the bar 64 is resiliently exerted under operation of the coil spring 90 (Fig. 3) which is mounted in the friction box 53 and which presses against the upper friction plate 60. The tension of this spring can be adjusted by adjustment of the screw 91 which threads into the friction box.

For cutting different gears, the eccentric 28 should be adjusted so that the maximum throw of the eccentric will occur where the maximum lengthwise crowning of the tooth is desired. For the purpose of adjusting the eccentric 28, there is a collar 97 secured to the shaft 25. This collar has a hole 96 drilled in it which is adapted to be engaged by a plunger 95 which is mounted in the clapper block 19. The collar 97 is so mounted angularly on the shaft 25 that the hole 96 is in angular alignment with the high point of the eccentric 28. Hence when the shaft 25 is rotated far enough to permit the plunger 95 to be pushed into the hole 96 of the collar 97, the eccentric 28 will be in such angular position that the clapper block 19 will be in its furthest withdrawn cutting position. To rotate the shaft 25 for the purpose of this adjustment, the change gear 75 is taken off the shaft 71 and the shaft 25 is rotated manually. When the shaft 25 has been rotated far enough to permit pushing the pin 95 into the hole 96 the tool slide 12 is adjusted on the tool arm 11 so that the tool T will be at that point along the length of a tooth of the gear being cut where maximum crowning is desired. For instance, if it is desired to have the maximum crowning at the center of the face of the gear, the tool will be adjusted longitudinally to the position $T_2$ (Fig. 7) when the pin 95 enters the hole 96. Then the gear 75 is replaced on the shaft 71 in mesh with the gear 76 and secured to the shaft 71.

The plunger 95 is slidably mounted in the clapper block 19 and is normally held out of operating position by the coil spring 98. This spring is interposed between the collar 99 formed on the plunger 95 and the block 100 which is secured to the clapper block 19.

The operation of the improved tool mechanism will readily be understood from the preceding description, but may briefly be summed up here. As each tool slide 12 or 12' takes its cutting stroke, the pinion 70 rolls on the rack 64, causing the shaft 25 and eccentric 28 to be rotated through the gearing 75—76. This causes the clapper block 19 to be moved about the shaft 24 as a pivot as the tool T or T' travels across the face of the blank. Thus the tool will travel in a depthwise arcuate path as shown in Fig. 7, the point of maximum convexity of this path being determined by the setting of the tool. When the tool slide reverses at the end of the cutting stroke, the friction box 53 will drag on the rack bar 64. Thus a momentary relative movement will take place between the slide and the friction-box and the lever 50 will be rocked about its pivot 55 through engagement of the pin 51 in the slot 52 of the friction box. The motion of the lever 50 will be transmitted through pin 48, block 47, rod 45, rack 44 and gear 42 to the shaft 24. Hence the clapper block 19 will be rocked about the axis $x$ of the shaft 25 to withdraw the tool T from cutting position. During the return stroke of the tool slide, the clapper box will remain in withdrawn position. Hence while the pinion 70 will roll on rack 64, on the return stroke of the tool slide, the tool will on this stroke simply travel in a circular arcuate path that will clear the blank and will not cut. When the tool slide reverses again, however, at the end of its return stroke, the drag of the friction box 53 on the rack 64 will cause the clapper block 19 to be swung about the shaft 24 to move the tool back to cutting position, so that on the new cutting stroke of the tool slide, the tool may cut again. The two tools operate alternately, one moving on its cutting stroke while the other is in withdrawn position on its return stroke.

To vary the amount of localization of tooth bearing and to allow for cutting gears of different face lengths with suitable localization of bearing, gears of different ratio can be substituted for the gears 75 and 76 shown. Thus the eccentric 28 may be made to rotate through a greater or less angular distance on the cutting stroke of the tool slide, and the height of the arc of the depthwise path of the tool may be increased or decreased.

While the invention has been described particularly in connection with a machine for cutting straight bevel gears, it will be understood that it is applicable to any machine, spur or bevel, in which reciprocating tools are employed. This application is intended to cover any variation, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for producing gears, a reciprocatory tool slide, a tool support pivotally mounted on the slide, a tool secured to the tool support, an eccentric operatively connected to the tool support, means for reciprocating the slide to impart cutting and return strokes to the tool, and means for rotating the eccentric to move the tool support about its pivot during the cutting strokes of the tool to vary the depth of cut of the tool.

2. In a machine for producing gears, an arm, a tool slide reciprocably mounted on said arm, a tool support pivotally mounted on the slide, a tool secured to the tool support, means for reciprocating the slide to impart cutting and return strokes to the tool, means actuated by the relative movement between the tool slide and arm during the cutting strokes to move the tool support about its pivot, and means for withdrawing the tool from cutting position on the return strokes of the slide.

3. In a machine for producing gears, an arm, a tool slide reciprocable mounted on said arm, a tool support pivotally mounted on the slide, a tool secured to the tool support, means for reciprocating the slide to impart cutting and return strokes to the tool, an eccentric operatively connected to the tool support, means actuated by the relative movement between the tool slide and the arm during the cutting strokes of the slide to rotate said eccentric thereby to vary the depth of cut of the tool, and means for withdrawing the tool from cutting position on the return strokes of the slide.

4. In a machine for producing gears, an arm, a tool slide reciprocably mounted on said arm, a tool support pivotally mounted on the slide, a tool secured to said tool support, means for reciprocating the slide to impart cutting and return strokes to the tool, an eccentric operatively connected to the tool support, a rack secured to said arm, gearing connecting the eccentric with the rack to rotate the eccentric on reciprocation of the tool slide, and means for withdrawing the tool from cutting position on the return strokes of the slide.

5. In a machine for producing gears, a reciprocable tool slide, a tool support pivotally connected to said slide at two spaced points, a tool secured to said tool support, means for reciprocating the slide to impart cutting and return strokes to the tool, means for moving the tool support about one of its pivots during the cutting strokes of the tool slide to vary the depth of cut of the tool as it moves across the face of a gear blank, and means for moving the tool support about the other of its pivots at opposite ends of the strokes of the tool slide to move the tool from and to cutting position, respectively.

6. In a machine for producing gears, a reciprocable tool slide, a clapper block, a tool secured to the clapper block, a pair of parallel shafts journaled in the slide, each having an eccentric part which is journaled in the clapper block, means for reciprocating the slide to impart cutting and return strokes to the tool, means for rotating one of said shafts during the cutting stroke of the slide to vary the depth of cut of the tool as it moves across the face of a gear blank, and means for rotating the other of said shafts at opposite ends of the strokes of the slide to move the tool from and to cutting position, respectively.

7. In a machine for producing gears, an arm, a tool slide reciprocably mounted on the arm, a clapper block, a tool secured to the clapper block, a pair of parallel shafts journaled in the slide, each having an eccentric part which is journaled in the clapper block, means for reciprocating the slide to impart cutting and return strokes to the tool, means operated by relative movement between the slide and arm for rotating one of said shafts during the cutting strokes of the slide to vary the depth of cut of the tool as it moves across the face of the gear blank, and means for rotating the other of said shafts at opposite ends of the strokes of the tool slide to move the tool from and to cutting position, respectively.

8. In a machine for producing gears, an arm, a tool slide reciprocably mounted on the arm, a clapper block, a tool secured to the clapper block, a pair of parallel shafts journaled in the slide, each having an eccentric part which is journaled in the clapper block, means for reciprocating the slide to impart cutting and return strokes to the tool, a rack bar secured to the tool arm and having teeth at one side thereof, gearing connecting the teeth of said rack with one of said shafts to rotate said shaft during the cutting strokes of the slide to vary the depth of cut of the tool as it moves across the face of a gear blank, and means operatively connected to the rack for rotating the other of said shafts at opposite ends of the strokes of the tool slide to move the tool from and to cutting position, respectively.

9. In a machine for producing gears, an arm, a tool slide reciprocably mounted on the arm, a clapper block, a tool secured to the clapper block, a pair of parallel shafts journaled in the slide and each having an eccentric part which is journaled in the clapper block, means for reciprocating the slide to impart cutting and return strokes to the tool, a rack bar secured to the arm and having teeth on one side thereof, gearing connecting the teeth of said rack with one of said shafts to rotate said shaft during the cutting strokes of the tool slide to vary the depth of cut of the tool as it moves across the face of a gear blank, and means for rotating the other of said shafts at opposite ends of the strokes of the slide to move the tool from and to cutting position, respectively, comprising a friction clamp which is slidable on the rack bar, and means operatively connecting the friction clamp to said other shaft.

10. In a machine for producing gears, a carrier, a tool slide reciprocably mounted on said carrier, a tool support pivotally connected to said slide at two spaced points, a tool secured to said tool support, means for reciprocating the slide to impart cutting and return strokes to the tool, means actuated by the relative movement between the tool slide and the carrier for moving the tool support about one of its pivots during the cutting strokes of the slide to vary the depth of cut of the tool as it moves across the face of a gear blank, and means for moving the tool support about the other of its pivots at opposite ends of the strokes of the slide to move the tool from and to cutting position, respectively.

11. In a machine for producing gears, a carrier, a tool slide reciprocable on said carrier, a tool support pivotally mounted on said slide, a tool secured to said tool support, a shaft journaled in the slide at a point spaced from said pivot, means for reciprocating the slide to impart cutting and return strokes to the tool, means actuated by relative movement between the tool slide and the carrier for rotating said shaft, and means carried by the shaft and operable on rotation thereof for rocking the tool support about its pivot during the cutting strokes of the tool slide to vary the depth of cut of the tool as it moves across the face of a gear blank.

12. In a machine for producing gears, a carrier, a tool slide reciprocably mounted on said carrier, a tool support pivotally mounted on said slide, a tool secured to said tool support, a shaft journaled in said slide at a point spaced from its pivot, means for reciprocating the slide to impart cutting and return strokes to the tool, means actuated by relative movement between the slide and the carrier for rotating said shaft, means carried by the shaft and operable on rotation thereof for rocking the tool support about its pivot during the cutting strokes of the slide to vary the depth of cut of the tool as it moves across the face of a gear blank, and means for rocking the tool support about said shaft at opposite ends of the strokes of the slide to move the tool from and to cutting position, respectively.

LEONARD O. CARLSEN.